United States Patent [19]
Mosteller

[11] 3,906,442
[45] Sept. 16, 1975

[54] TRACTOR-TRAILER SENSING APPARATUS FOR INDICATING THE PROXIMITY OF THE TRAILER TO THE TRACTOR

[76] Inventor: Vern D. Mosteller, 2412 W. State Rd., Hastings, Mich. 49058

[22] Filed: June 27, 1973

[21] Appl. No.: 374,094

[52] U.S. Cl. .................. 340/61; 340/282; 200/61.44
[51] Int. Cl.² ......................................... G08B 21/00
[58] Field of Search ............. 340/52 R, 61, 70, 104, 340/258 R, 282; 200/61.42, 61.43, 61.44; 180/103, 91

[56] References Cited
UNITED STATES PATENTS

| | | | |
|---|---|---|---|
| 2,927,310 | 3/1960 | Knapp | 200/61.42 X |
| 3,269,783 | 8/1966 | Kriz | 340/61 X |

Primary Examiner—Alvin H. Waring
Attorney, Agent, or Firm—Price, Heneveld, Huizenga and Cooper

[57] ABSTRACT

A sensing apparatus for indicating the proximity of an element or object moving relative to another object on which the sensor is mounted. The apparatus includes a pivotally mounted arm having an extending contact rod for closing a limit switch which, in turn, activates a warning light or buzzer. Means are included to guard the switch from premature or undesired activation. One application of the sensor is to warn the driver of a tractor-trailer unit that the corner of the trailer is approaching the tractor when the unit is being turned.

21 Claims, 5 Drawing Figures

PATENTED SEP 16 1975 3,906,442

TRACTOR-TRAILER SENSING APPARATUS FOR INDICATING THE PROXIMITY OF THE TRAILER TO THE TRACTOR

This invention relates to sensing devices for indicating the distance of one object from another and, more particularly, to a sensing apparatus for indicating the proximity of one portion of a vehicle or the like to another portion of that vehicle or to an external object.

BACKGROUND OF THE INVENTION

The ability to detect the proximity or closeness of one object to another object when the space or distance between those objects is blocked from view has long been a problem in many fields. The problem is especially acute in the trucking industry and especially in large, semitrailer trucks. Such trucks generally comprise a tractor and one or more trailer units. The maneuvering of the tractor-trailer combination usually requires backing the trailer into a limited or tight space for loading or unloading, or turning the tractor and trailer through small radius turns. During such backing or turning movements, the front edges and corners of the trailer are often moved into close proximity to the rear of the tractor as the trailer pivots about its hitch. Since the area between the tractor and trailer is generally blocked from the view of the driver of the tractor, substantial damage can result to both the trailer and tractor if the trailer is allowed to contact or hit the rear of the tractor in such maneuvers. Although the driver attempts to avoid such "jackknife" situations, he must normally rely only on his obstructed vision and past experience to prevent such occurrences. Accordingly, drivers of such tractor-trailer units have been unable to positively and accurately judge the distance between the tractor and trailer during such maneuvering.

Similar problems may arise in the operation of other vehicles such as forklift trucks and heavy construction equipment or the like. The operation of such equipment entails the positioning of various elements thereof with respect to one another as well as objects external of such vehicles. Because of the size and bulk of such vehicles, many of the areas or elements to be positioned are obstructed or blocked from the view of the operator. As with the tractor-trailer units mentioned above, the operators of such equipment must rely only upon their reduced, often obstructed vision and prior practical experience in positioning and operating such vehicles.

SUMMARY OF THE INVENTION

Accordingly, it is an object and purpose of the present invention to provide a sensing apparatus for indicating the proximity of one object or element with respect to another object or element moving relative to the first. A particularly useful application of the apparatus is made by positioning the apparatus on one portion of a vehicle such as a truck or tractor, forklift truck, heavy construction vehicle or the like so that the approach of one portion of the vehicle to another portion thereof, or to objects external of the vehicle, is positively and accurately ascertained by the operator or driver of the vehicle from his operating position. The sensor is adapted to be located at a position remote from the driver or operator's location and to provide a signal such as a warning light or buzzer in the immediate area of the driver when the area of the vehicle in which the sensor is located either approaches or is approached too closely by another object.

In the preferred embodiment, the proximity sensor comprises a hollow, generally rectangular, body or housing secured to an appropriate area of a vehicle. The housing surrounds a normally-opened, limit switch which is closed by the engagement of a contacting means with an element or object approaching the vicinity of the sensor. The contacting means includes an arm pivotally secured within the housing and biased away from the limit switch by a suitable biasing means. An adjustable length contacting rod is secured normally to the pivotal arm such that it extends through an aperture provided in the housing. After the length of the rod has been set at a predetermined length, approach of an object closer than the length of the rod will cause a corresponding pivotal movement of the arm which in turn closes the switch. The contacting rod includes means allowing it to flex or "give" after an object is contacted and the switch is closed whereby damage to the rod or sensor is prevented. The switch is preferably connected to an electric warning light or buzzer adjacent the driver of the vehicle on which the sensor is located to indicate when the switch is closed and therefore that an object is within the warning range of the sensor. The enclosing or surrounding of the pivotal arm and limit switch by the housing provides a guard for preventing damage to the sensor or undesired closing of the limit switch by means other than the contacting rod.

These and other objects, advantages, purposes and features of the invention will become more apparent from a study of the following description taken in conjunction with the drawings.

DESCRIPTION OF THE PREFERRED EMBODIMENT

Figure 1:
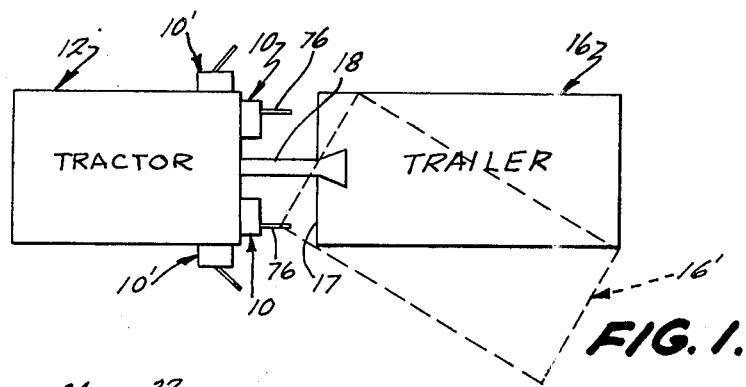
FIG. 1 is a schematic illustration of one application of the present proximity sensor wherein the sensor is shown enlarged for explanation and is positioned to warn the driver of a tractor-trailer unit that the front edge or corner of the trailer is approaching the rear of the tractor.

Referring now to the figures in greater detail, FIG. 1 illustrates one application of the proximity sensor or indicating apparatus 10 of the present invention. A proximity sensor 10 is secured to the rear 14 of a tractor or truck cab 12 adjacent each corner thereof. A trailer 16, hitched to the tractor 12 via a hitch 18, secures the trailer immediately behind the tractor such that the proximity sensors 10 are located generally between the rear 14 of tractor 12 and the front 17 of trailer 16. When the tractor and trailer must be maneuvered as a unit through small radius turns, either backward or forward, the trailer will pivot generally out of rectilinear alignment with the tractor into a skewed position such as that shown in phantom at 16' in FIG. 1. In the skewed position, the front corners of the trailer can become damaged or ruined if they hit or impact against the rear 14 of the tractor if the trailer is caused to move through too small a turning radius. This is especially true because the space between the tractor and trailer is generally blocked from the view of the driver. However, with the proximity sensors 10 of the present invention located as illustrated, the front corners of the trailer will engage the extending contact rods 76 of the sensors 10, and provide a positive and accurate warning to the driver of the tractor of the proximity of the trailer to the rear of his tractor. The proximity sensors may also be located as at 10' on the respective sides of the tractor 12. In this case rods 76 will be mounted at a rearward angle and will be contacted by obstacles adjacent either side of the truck as well as by the trailer.

Figures 2, 4:
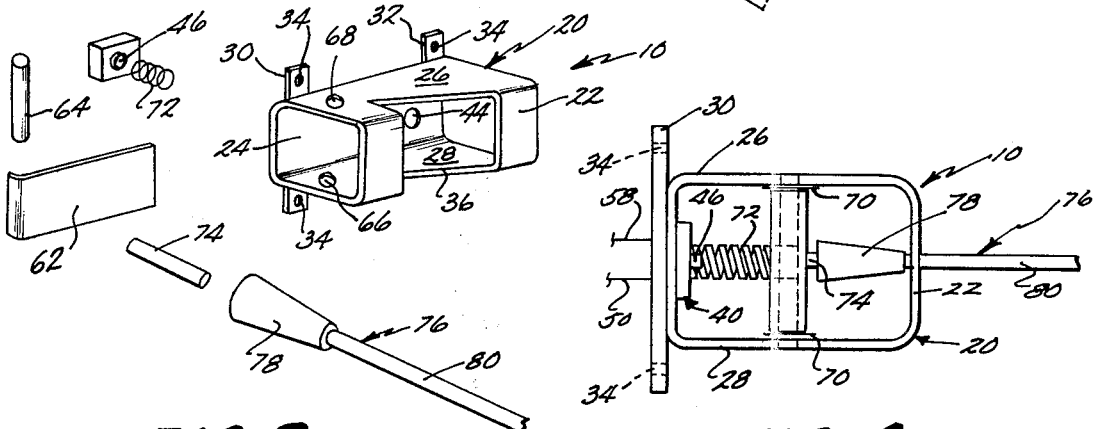
FIG. 2 is an exploded, fragmentary, perspective view of the proximity sensor of the present invention.
FIG. 4 is a fragmentary, end elevation of the proximity sensor shown in FIG. 3 excluding the warning device.
Figure 3:
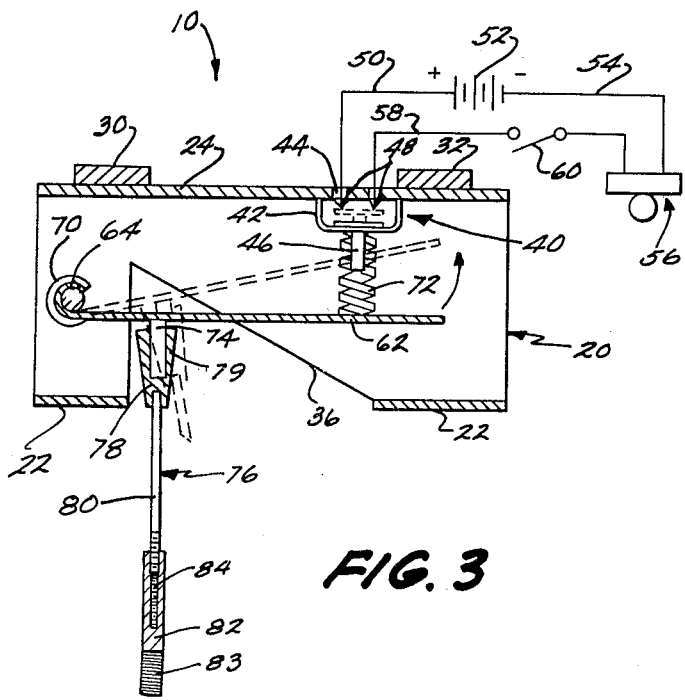
FIG. 3 is a cross-sectional, plan view of the assembled proximity sensor shown in FIG. 2 including a schematic representation of a warning device connected thereto and one embodiment of an adjustment and shock absorbing means on the contacting rod.
Figure 5:
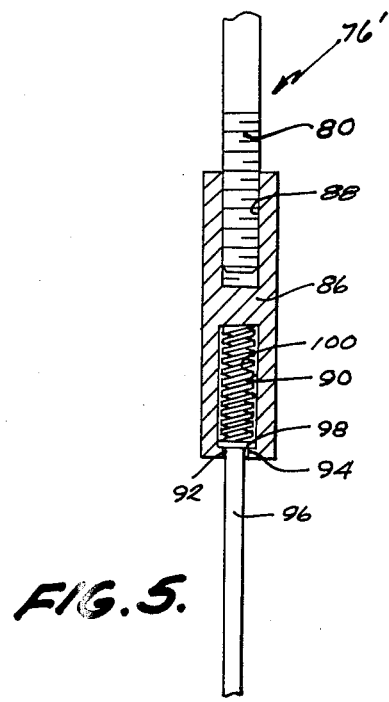
FIG. 5 is a fragmentary, cross-sectional view of an alternative embodiment of an adjustment and shock absorbing means on the contacting rod.

Referring now to FIGS. 2–4, the preferred embodiment of the proximity sensor 10 includes a hollow, generally rectangular housing or body 20 formed from steel, aluminum, plastic or the like and having front and back walls 22 and 24, respectively, as well as top and bottom walls 26 and 28, respectively. The ends of the housing 20 are open. However, these ends may be closed with suitable coverings or members to protect the element within the housing from mud, corrosive road salt or the like. Securing members 30 and 32 are secured across the exterior of back wall 24 generally transverse to the longitudinal axis of the cylindrical housing 20 via welding, bonding or the like. Securing members 30 and 32 include apertures 34 through which suitable securing means such as bolts, riviets or the like may be received to secure the sensor 10 to the body of a truck or other vehicle as illustrated in FIG. 1. A generally wedge-shaped aperture 36 is cut or otherwise formed through front wall 22 of body 20 into the enclosing top and bottom walls 26 and 28 to provide space for the protrusion of contacting rod 76 therethrough.

Aperture 36 may be otherwise shaped or formed, it being necessary only that sufficient space is provided to allow rod 76 to swing (to the right as is shown in FIG. 1) when an object is contacted thereby. Thus, a rectangular slot in front wall 22 extending generally parallel to top and bottom walls 26 and 28 would also suffice for this purpose. It may also be desirable to make aperture 36 as small as possible to prevent the introduction of foreign materials such as mud, road salt or the like into the interior of the sensor housing 20.

Received within the body or housing 20 are the operative elements of the sensor which allow it to provide a warning signal to a driver or operator of a vehicle on which the sensor is mounted. As shown in FIGS. 2–4, these elements include a normally open, limit switch 40 having a generally hollow, rectangularly shaped housing 42 (FIG. 3) secured to the back wall of the housing 20 generally in registry with an aperture 44 provided in the back wall 24. Protruding through the front wall of housing 42 is a slideable, plunger type contact element 46 which is normally biased outwardly or away from the contact poles 48 on the back of the switch via suitable biasing means. One of the contact poles 48 is connected via electric wire 50 to an electrical power source 52. Source 52 may comprise either the power source of the vehicle on which the sensor 10 is mounted or a separate, portable and replaceable power source such as a dry cell battery or the like. The power source 52 is in turn connected via a wire 54 to either an audio or visual warning device 56 which is typically mounted on the dashboard of the tractor or other vehicle on which the sensor 10 is mounted. The circuit is completed when the plunger contact element 46 is closed across poles 48 by another wire 58 which may include a master on-off switch 60 also typically located on the dashboard of the vehicle to provide a master control for controlling operation of the entire sensing unit. Alternatively, in place of wire 58, the second pole of the double pole 48 and the second lead from the warning device 56 may be grounded to the vehicle body to complete the circuit. The warning device itself may comprise either an electric light, electric buzzer, electric bell, or the like of suitable electrical voltage and amperage capacity for the power source 52. Accordingly, when switch 40 is closed, warning device 56 will provide either an audio or visual warning to the driver of the vehicle of the proximity of the trailer or other object to the driver's vehicle.

Pivotally secured within the housing 20, generally in registry with the limit switch 40, is an actuator leaf or arm 62. As shown in FIGS. 3 and 4, arm 62 is rigidly secured via welding, bonding or the like to a pivotally mounted pivot pin 64 extending between the opposing top and bottom walls 26 and 28 respectively. Both the pivot pin 64 and arm 62 are generally perpendicular to the top and bottom walls 26 and 28. Pin 64 comprises a rod having a generally circular cross-section which is received in coaxial, circular apertures 66 and 68 in the top and bottom walls. The ends of the pivot pin 64 are generally flush with the exterior of walls 26 and 28 and the pin is retained in its pivotal position via clip-on or snap-on retaining rings or other similar securing means 70 received about the pin generally adjacent the interior of each of walls 26 and 28. Arm 62 is biased away from limit switch 40 by a coil spring or other biasing means 72 received over the plunger element 46 and secured to the back of the arm 62.

Secured generally normally to the surface of arm 62 generally adjacent the pivot pin 64 and in registry with the aperture 36 in housing 20 is a stud or pin 74. Received over the stud 74 is an extending contact rod 76. Rod 76 comprises a generally truncated, frusto-conical base section 78 having a cylindrical receptacle corresponding in size to pin 74 and including a set screw or other securing means 79 for rigidly but removably securing the base 78 and connecting rod 76 to stud 74. Received in the narrow end of base 78 is an extending rod 80 to which may be secured one or more extension sections 82 as shown in FIG. 3. Alternatively, as will be appreciated by those skilled in the art, contact rods 76 may be mounted at an angle with respect to the surface of arm 62 (see 10' FIG. 1). The mounting angle of the contact rod is chosen according to the desired location and application in which the sensor is to be used.

Rod 76 preferably includes shock absorbing means for allowing the rod to flex or "give" when an object is contacted thereby to prevent damage to the sensor. Section 82 preferably comprises a flexible section having sufficient resiliency to allow the force of spring 72 to be overcome after which the section will bend, flex, or bow outwardly to avoid damage. Thus section 82 includes a tightly coiled, spring section 83 for this purpose (FIG. 3). Further, extension section 82 includes a threaded receptacle mating with the threaded end of rod 80 such that section 82 may be axially adjusted along the end of rod 80 to vary the length of contacting rod 76. Adjustment of the length of rod 76 accordingly varies the warning range of the proximity sensor 10.

Alternatively, a second type of connecting rod 76' may be used wherein the shock absorbing means may comprise a cylindrical connector 86 including a threaded receptacle 88 into which the end of section 80 is threaded for adjustment of the length of rod 76'. Connector 86 also includes a smooth-sided receptacle 90 at its opposite end having a flange 92 forming an opening 94 having a cross-sectional area less than that of receptacle 90. A telescoping section 96 is slideably received in receptacle 90. Section 96 includes a foot 98 which prevents the section from escaping from receptacle 90 by abutting against flange 92 and also helps guide the telescoping action of section 96. A spring or other biasing means 100 seats against the opposite side of foot 98 to bias section 96 outwardly away from the sensor. Spring 100 has a compressive strength greater than spring 72 such that once switch 40 is closed, further movement of sensor 10 relative to the object whose presence is being sensed will cause section 96 to telescope inwardly preventing damage thereto or to the sensor. Other telescoping or flexing means as may be apparent to those skilled in the art may also be used including a combination of the two embodiments described above. Thus, a rod including a coiled spring section such as rod 83 may be substituted for rod 96 but with the inclusion of a foot 98. Further, various lengths of extension sections may be chosen to allow the sensor to be applied to different applications.

Referring to FIG. 3, the operation of the proximity sensor 10 will now be understood. Sensor 10 is positioned in an appropriate location such as that shown in FIG. 1 between the rear 14 of tractor 12 and the front edge 17 of trailer 16. The length of the contacting rod 76 is adjusted to a predetermined length appropriate for the size of the turning radius desired by the driver of the tractor-trailer unit. On-off switch 60 is closed and the sensor 10 is therefore ready for operation as shown by the solid lines in FIG. 3. Should the front edge 17 of the trailer 16 approach and engage contacting rod 76, such as when the tractor and trailer are turned as shown in FIG. 1, the contacting force transmitted through rod 76 will cause the arm 62 and pivot pin 64 to pivot against the biasing action of spring 72 (phantom lines in FIG. 3). Aperture 36 is shaped to provide sufficient space for the pivotal movement of contact rod 76. The pivotal movement of arm 62 forces arm 62 into contact with plunger 46 and causes the plunger to be telescoped or pushed into the housing 42 of switch 40 thereby forming an electrical connection between the double poles 48 which completes the circuit to warning device 56. Further movement of the trailer toward the tractor will cause the shock absorbing means included in the contact rod to flex or telescope to prevent damage to the sensor.

At this point, device 56 will emit an audio signal or a visual signal indicating to the driver of the tractor that the edge of the trailer is within the predetermined approach limit and that the radius of the turn should not be decreased any further. The front wall 22 and top and bottom walls 26 and 28, respectively, which surround the pivotal arm 62 and limit switch 40, provide a guard which prevents the switch from being closed except by the pivotal movement of arm 62 as actuated by contacting rod 76. The surrounding housing also prevents the arm and switch elements from being damaged or crushed should an object strike the sensor. In order to assure that this guard is substantial and effective, the housing, of which the guard forms an integral part, is made from a strong, rigid material such as steel, aluminum, molded plastic, or the like as mentioned above.

Therefore, it will be understood that the present invention provides a proximity sensor or warning device which positively and accurately warns a driver or operator of a nonvisible situation wherein an object is approaching too closely to the proximity sensor. It will be understood that the strength of the coil spring 72 may be chosen to provide a predetermined biasing force against which the arm 62 must be pivoted. The strength of the contacting force which is sufficient to actuate the sensor is therefore controllable. Further, the length and mounting angle of the contacting rod 76 may be adjusted over a wide range to allow the sensor to be used in many different applications for the sensing of various distances between objects. Finally, it will be understood that the invention may be manufactured from durable, all weather type materials, such as a noncorrosive metal or a plastic which are resistant to the effects of weather, industrial residues and the like. Accordingly, the proximity sensor of the present invention may be manufactured easily and inexpensively and yet is well suited for exterior applications and will have a long, maintenance-free life.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property or privilege is claimed are defined as follows:

1. Proximity sensing apparatus for providing a warning of the closeness of one element moving relative to another comprising support means for supporting said apparatus on an element in position to be contacted by another element moving toward the one element; contact means for engaging said other element moving relative to said one element; and switch means for engagement by said contact means to provide a signal indicating the location of said other element at a predetermined distance from said one element; said support means including an elongated housing generally encompassing said switch means and having an aperture therein; said contact means including a pivot arm pivotally secured at one end within said housing, extending to a position adjacent said switch means, and being pivotable to engage and close said switch means, and elongated, extending rod means secured to said pivot arm and extending through said aperture a predetermined distance beyond said housing for engaging said other element as it approaches said one element and causing pivotal movement of said pivot arm into engagement with said switch means; said extending means including deflectable means for absorbing a further change in distance between said elements after said arm is pivoted into contact with said switch means, said deflectable means including an elongated rod including at least one flexible, yieldable section having sufficient rigidity to pivot said pivot arm into engagement with said switch means when contacted by said one element as it approaches the other as well as sufficient resiliency to bend or flex to prevent damage to said sensing apparatus including said rod and switch means as well as said elements when said other element continues to approach said one element after said pivot arm contacts and closes said switch means, said resiliency being sufficient to return said rod and flexible, yieldable section to its original configuration after said other element is moved away from said one element; said rod including a spring element along its length, said spring element providing both said sufficient rigidity to operate said pivot arm and switch means and sufficient resiliency to prevent said damage to said sensing apparatus including said rod and switch means as well as said elements.

2. The apparatus of claim 1 wherein said extending rod means include means for adjusting the length thereof separate and apart from said deflecting means.

3. Proximity sensing apparatus for providing a warning of the closeness of one element moving relative to another comprising support means for supporting said apparatus on an element in position to be contacted by another element moving toward the one element; contact means for engaging said other element moving relative to said one element; and switch means for engagement by said contact means to provide a signal indicating the location of said other element at a predetermined distance from said one element; said support means including an elongated housing generally encompassing said switch means and having an aperture therein; said contact means including a pivot arm pivotally secured at one end within said housing, extending to a position adjacent said switch means, and being pivotable to engage and close said switch means, and elongated, extending rod means secured to said pivot arm and extending through said aperture a predetermined distance beyond said housing for engaging said other element as it approaches said one element and causing pivotal movement of said pivot arm into engagement with said switch means; said extending means including deflectable means for absorbing a further change in distance between said elements after said arm is pivoted into contact with said switch means, said deflectable means including an elongated rod including at least one flexible, yieldable section having sufficient rigidity to pivot said pivot arm into engagement with said switch means when contacted by said one element as it approaches the other as well as sufficient resiliency to bend or flex to prevent damage to said sensing apparatus including said rod and switch means as well as said elements when said other element continues to approach said one element after said pivot arm contacts and closes said switch means, said resiliency being sufficient to return said rod and flexible, yieldable section to its original configuration after said other element is moved away from said one element; said elongated rod including a plurality of telescoping elements; said deflecting means including biasing means for biasing said at least one of said telescoping elements into an extended position but allowing a reduction in length thereof when said other element continues to approach said one element following said engagement of said pivot arm with said switch means.

4. The apparatus of claim 3 wherein said extending rod means also includes means for adjusting the length thereof separate from said deflectable means, said adjusting means including means for sliding said plurality of telescoping elements with respect to one another.

5. Proximity sensing apparatus for providing a warning of the closeness of one element moving relative to another comprising support means for supporting said apparatus on an element in position to be contacted by another element moving toward the one element; contact means for engaging said other element moving relative to said one element; and switch means for engagement by said contact means to provide a signal indicating the location of said other element at a predetermined distance from said one element; said support means including an elongated housing generally encompassing said switch means and having an aperture therein; said contact means including a pivot arm pivotally secured at one end within said housing, extending to a position adjacent said switch means, and being pivotable to engage and close said switch means, and elongated, extending rod means secured to said pivot arm and extending through said aperture a predetermined distance beyond said housing for engaging said other element as it approaches said one element and causing pivotal movement of said pivot arm into engagement with said switch means; said extending means including deflectable means for absorbing a further change in distance between said elements after said arm is pivoted into contact with said switch means, said deflectable means including an elongated rod including at least one flexible, yieldable section having sufficient rigidity to pivot said pivot arm into engagement with said switch means when contacted by said one element as it approaches the other as well as sufficient resiliency to bend or flex to prevent damage to said sensing apparatus including said rod and switch means as well as said elements when said other element continues to approach said one element after said pivot arm contacts and closes said switch means, said resiliency being sufficient to return said rod and flexible, yieldable section to its original configuration after said other element is moved away from said one element; said support means including a hollow, generally rectangular, elongated housing including front, back, top, and bottom walls, said front wall including an aperture therein spaced between the ends of said housing and generally dividing said housing into two end portions; one end portion surrounding and protecting said switch means, the other end surrounding and protecting said pivotally secured end of said pivot arm; said rod extending outwardly beyond said housing through said aperture from said pivot arm and having means for adjusting the length of said rod separate from said deflecting means.

6. The apparatus of claim 5 wherein said arm is mounted on a pivot pin extending between said top and bottom walls of said housing; said extending rod being rigidly secured to said arm adjacent said pivot pin and in registry with said aperture.

7. The apparatus of claim 1 wherein said switch means includes electrical means including an electrical warning device; said electrical means providing an electrical current to said warning device when said contact means moves said switch to said closed position.

8. The apparatus of claim 7 wherein said warning device comprises an electric light; said electrical means further including separate switch means for interrupting said electric current to said light.

9. The apparatus of claim 7 wherein said warning device comprises an electric buzzer.

10. A sensing device for tractor vehicles designed to pull trailers, the device adapted to indicate the proximity of a portion of a trailer to a tractor vehicle when said tractor vehicle is turned through a predetermined turning radius; said device comprising a body adapted to be rigidly secured to a tractor vehicle; a switch including signal means movable between open and closed positions for providing a signal in said closed position; a warning apparatus responsive to the signal provided by said signal means and adapted to be secured within a tractor vehicle to alert the driver thereof; an arm pivotally mounted on said body for opening and closing said switch; means for normally biasing said arm away from said switch; guard means surrounding said arm and switch for protecting said switch and arm; and contact means extending beyond said guard means for engaging a trailer hitched to the tractor vehicle including said device and closing said switch when a portion of said trailer is within a predetermined distance from said tractor vehicle; said contact means including an elongated element having deflectable means for absorbing a further change in distance between said tractor and trailer after said arm has pivoted into contact with said switch said deflectable means including an elongated rod including at least one flexible, yieldable section having sufficient rigidity to pivot said pivot arm into engagement with said switch means when contacted by said trailer as it approaches the tractor as well as sufficient resiliency to bend or flex to prevent damage to said sensing device including said rod and switch as well as said tractor and trailer when said trailer continues to approach said tractor after said pivot arm contacts and closes said switch, said resiliency being sufficient to return said rod and flexible, yieldable section to its original configuration after said trailer is moved away from said tractor; said rod including a spring element along its length, said spring element providing both said sufficient rigidity to operate said pivot arm and switch and sufficient resiliency to prevent said damage to said sensing apparatus including said rod and switch as well as said tractor and trailer.

11. The device of claim 10 wherein said switch, includes an electric limit switch having a plunger type closing element, said warning apparatus including an electric buzzer; said buzzer connected to said switch via suitable electric wiring including an electrical power source.

12. The device of claim 11 wherein said guard means includes a housing generally surrounding said switch and arm and having an aperture in registry with at least a portion of said arm; said contact means comprising a rod having means for adjusting the length thereof separate from said deflectable means, said rod being secured generally normal to said arm in registry with said aperture and generally parallel to said plunger on said switch, said rod extending through said aperture.

13. A sensing device for tractor vehicles designed to pull trailers, the device adapted to indicate the proximity of a portion of a trailer to a tractor vehicle when said tractor vehicle is turned through a predetermined turning radius; said device comprising a body adapted to be rigidly secured to a tractor vehicle; a switch including signal means movable between open and closed positions for providing a signal in said closed position; a warning apparatus responsive to the signal provided by said signal means and adapted to be secured within a tractor vehicle to alert the driver thereof; an arm pivotally mounted on said body for opening and closing said switch; means for normally biasing said arm away from said switch; guard means surrounding said arm and switch for protecting said switch and arm; and contact means extending beyond said guard means for engaging a trailer hitched to the tractor vehicle including said device and closing said switch when a portion of said trailer is within a predetermined distance from said tractor vehicle; said contact means including an elongated element having deflectable means for absorbing a further change in distance between said tractor and trailer after said arm has pivoted into contact with said switch, said deflectable means including an elongated rod including at least one flexible, yieldable section having sufficient rigidity to pivot said pivot arm into engagement with said switch means when contacted by said trailer as it approaches the tractor as well as sufficient resiliency to bend or flex to prevent damage to said sensing device including said rod and switch as well as said tractor and trailer when said trailer continues to approach said tractor after said pivot arm contacts and closes said switch, said resiliency being sufficient to return said rod and flexible, yieldable section to its original configuration after said trailer is moved away from said tractor; said guard means including an integral portion of said body; said body comprising a hollow, generally rectangular, elongated housing and means for securing said housing to a tractor vehicle; said arm pivotally secured within said housing at one end thereof and biased away from said signal means which is secured at the opposite end of said housing therewithin and in registry with said arm; said housing including front, back, top, and bottom walls, said front wall including an aperture therein spaced between the ends of said housing and generally dividing said housing into two end portions; one end portion surrounding and protecting said switch, the other end surrounding and protecting said pivotally secured end of said pivot arm; said rod extending outwardly beyond said housing through said aperture from said pivot arm; a spring element included along the length of said rod, said spring element providing both said sufficient rigidity to operate said pivot arm and switch and sufficient resiliency to prevent said damage to said sensing apparatus including said rod and switch as well as said tractor and trailer.

14. The apparatus of claim 1 wherein said switch includes a movable plunger for closing an electrical circuit; a coil spring extending between said switch means and one surface of said pivot arm, said spring encompassing at least one end of said plunger and biasing said arm away from said plunger.

15. The device of claim 10 wherein said switch includes a movable plunger for closing an electrical circuit; said means for normally biasing said arm away from said switch including a coil spring extending between said switch means and one surface of said pivot arm, said spring encompassing at least one end of said plunger and biasing said arm away from said plunger.

16. The apparatus of claim 1 wherein said elongated, flexible rod includes means for adjusting the length thereof separate from said deflectable means, said adjusting means including a threaded element and corresponding threads on said elongated flexible rod for axially adjusting the position of said rod with respect to said threaded element.

17. The apparatus of claim 1 wherein said rod has an axis of elongation; said spring element including a plurality of coils extending along a common axis and forming a coil spring, said common axis being generally parallel to said axis of elongation of said rod.

18. The apparatus of claim 17 wherein said extending rod means also includes means for adjusting the length thereof separate from said deflectable means, said length adjusting means including means for sliding said plurality of telescoping elements with respect to one another.

19. The device of claim 10 wherein said rod has an axis of elongation; said spring element including a plurality of coils extending along a common axis and forming a coil spring, said common axis being generally parallel to said axis of elongation of said rod.

20. The device of claim 1 wherein said extending rod means also includes means for adjusting the length thereof separate from said deflectable means, said length adjusting means including means for sliding said plurality of telescoping elements with respect to one another.

21. The apparatus of claim 3 wherein said switch includes a movable plunger for closing an electrical circuit; a coil spring extending between said switch means and one surface of said pivot arm, said spring encompassing at least one end of said plunger and biasing said arm away from said plunger; said biasing means included in said deflecting means having a compressive strength greater than said coil spring extending between said switch means and one surface of said pivot arm.

* * * * *